United States Patent [19]
Clarke et al.

[11] 3,871,845
[45] Mar. 18, 1975

[54] INDUSTRIAL AIR FILTER
[75] Inventors: Ralph H. Clarke; Wesley James Clarke; Steven L. Mays, all of Eugene, Oreg.
[73] Assignee: Clarke's Sheet Metal, Inc., Eugene, Oreg.
[22] Filed: June 25, 1973
[21] Appl. No.: 373,433

[52] U.S. Cl................. 55/284, 55/287, 55/294, 55/302, 55/341, 55/378
[51] Int. Cl............................................. B01d 46/02
[58] Field of Search ............ 55/293, 284, 294, 287, 55/341, 302, 378, 379, 380, 430, 432

[56] References Cited
UNITED STATES PATENTS
| | | | |
|---|---|---|---|
| 540,720 | 6/1895 | Clark | 55/302 |
| 2,369,649 | 2/1945 | Abrams | 55/287 |
| 2,850,112 | 9/1958 | Dru | 55/287 |

FOREIGN PATENTS OR APPLICATIONS
1,909,547  9/1970  Germany .............................. 55/294

*Primary Examiner*—Bernard Nozick
*Attorney, Agent, or Firm*—James D. Givnan, Jr.

[57] ABSTRACT

A filter structure having a central air inlet with said inlet discharging downwardly into a circular enclosure having ports thereabout through which the air is laterally diverted. Plenums associated with said ports discharge dust laden air upwardly into filter bag ends for flow therealong and ultimately through the bag wall depositing particles thereon. A purge assembly sequentially blocks the entry of dust laden air into the ports and hence the filter bags while simultaneously applying a negative pressure to the bag interior for purging of same. The purge assembly includes means for removing deposited dust particles from a floor surface of the enclosure.

13 Claims, 6 Drawing Figures

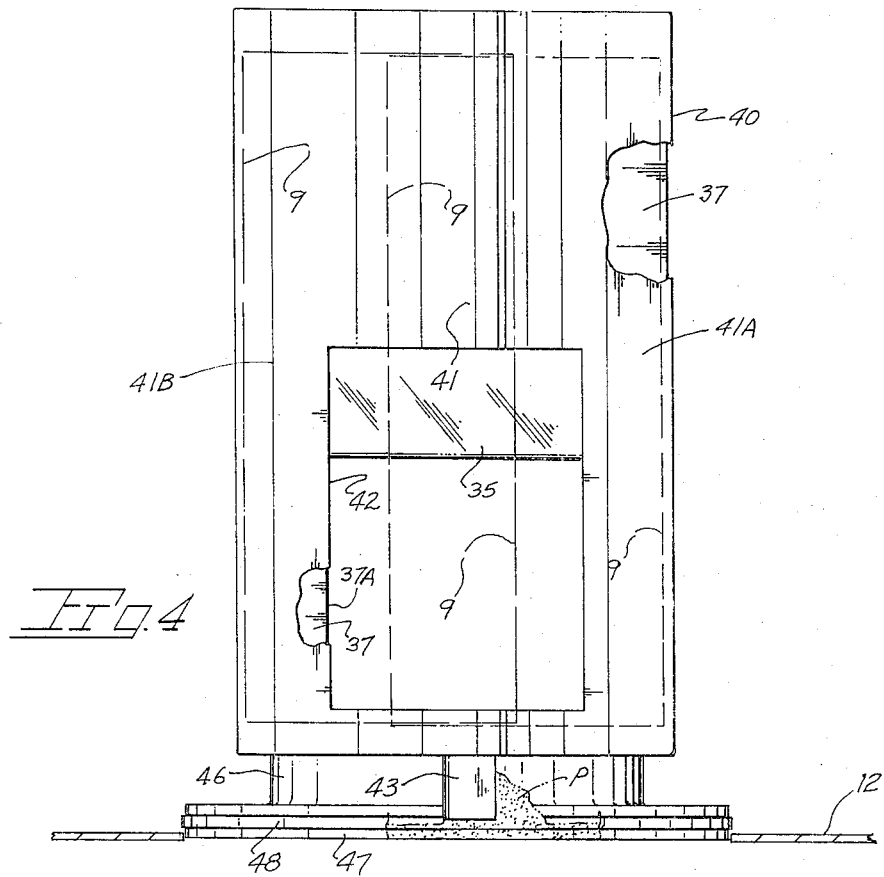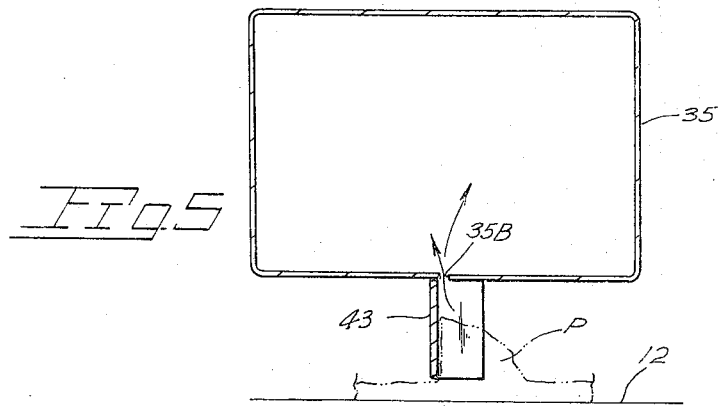

INDUSTRIAL AIR FILTER

BACKGROUND OF THE INVENTION

The present invention relates to filters of the type providing final filtration to dust or dirt laden air before return to the atmosphere. Such final filtering apparatuses may be associated with separators which initially remove larger particles from the air being cleaned.

Well known in the present art are industrial air filters utilizing elongate fabric bags through the walls of which is directed the airflow being filtered with the air following essentially a right angular path through the filter. Particles accumulated on the upstream side of the bag wall are separated therefrom at intervals by a momentary reverse flow of air through the bag wall with the separated particles being collected in a hopper below the bags for periodic removal. Important to the operation of those filters is a complex duct structure for sequential communication with the bag ends to apply a reverse air blast to the bags being purged. Examples of such complex duct structure are found in U.S. Pat. Nos. 2,976,953 and 2,974,748 wherein the structures trigger at intervals a forceful reverse air flow into the end of the bag being cleaned. The reverse or cleaning flow of air must have a high pressure differential in view of the bag being continuously subjected to the incoming dust laden air from a pressurized source such as a blower. For particle dislodgement from the bag surface there must occur a rapid and substantial change in the pressure differential all of which requires costly structure as disclosed in the above mentioned apparatuses. The resulting air filters are costly both from a price and maintenance standpoint. Further such filters require periodic servicing for removal of dirt from collection areas.

SUMMARY OF THE INVENTION

The present invention is embodied within a filter receiving a flow of air following a vertical path which flow is diverted for a reverse flow into the lower ends of a filter bag. A purge assembly sweeps into communication with the filter bags to momentarily close off the dust laden airflow and secondly, simultaneously apply a negative air pressure to the interior of the sealed off filter bag. An arcuate face plate on the purge assembly provides a seal to provide for the closing off of the bags while a purge opening formed in said face plate communicates a negative pressure to certain bag interiors. Rotational travel of the purge assembly is continuous as is the negative pressure therein. Complicated structure for creating a sudden reverse air blast is dispensed with as is means for indexing a duct into a purging position. The rotating purge assembly travels within a walled enclosure with the purge assembly face plate in continuous sweeping contact with the wall.

Important objectives of the present filter include the provision of low cost, low maintenance filter capable of meeting stringent air pollution controls now being enacted by governmental bodies.

A further important object is the provision of a filter structure in which purging of the filter bags and removal of the purged particles are both accomplished by application of a negative pressure to the bag interior. The present purge assembly further includes means for vacuuming particles from a floor surface of the filter, said particles being deposited on said surface during diversion of the dust laden air flow.

A further important objective of the present invention is the provision of an air filter having a low pressure differential between operating and purge pressures thus obviating costly blowers, timing mechanisms for triggering a reverse blast of highly pressurized air and means for indexing a highly pressurized air duct into communication with filter bags.

Another important objective is to provide a filter highly compatible with other air treating equipment such as cyclonic separators with the normal exhaust flow of such being adequate for the inlet flow of the present filter. A suitable pressure differential for purging purposes is achieved by the intake of a medium sized centrifugal blower which may further serve to convey the purged material back to a mechanical separator.

BRIEF DESCRIPTION OF THE DRAWINGS

In the accompanying drawings:

FIG. 4 is an end elevational view of the purge assembly taken along line 4-4 of FIG. 2 with relative port positions in phantom lines, FIG. 5 is a sectional elevation of the purge assembly duct taken along line 5—5 of FIG. 2, and FIG. 6 is a detailed view of a filter bag holder.

DESCRIPTION OF THE PREFERRED EMBODIMENT

Figure 1:
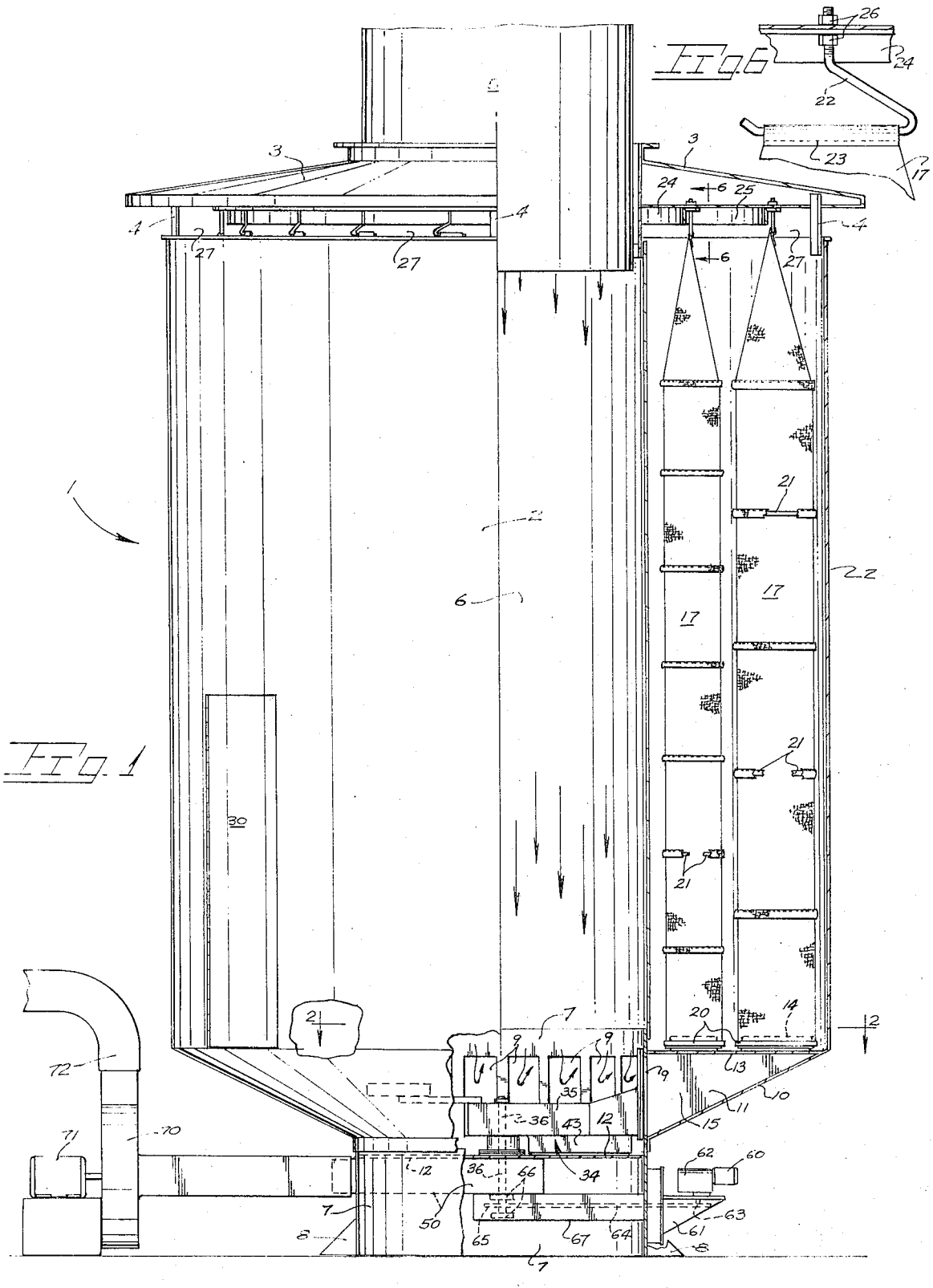
FIG. 1 is an elevational view of the present air filter structure with portions thereof removed along a vertical center line for purposes of illustration.

With continuing reference to the accompanying drawings wherein applied reference numerals indicate parts similarly identified in the following specification, the reference numeral 1 indicates generally the filter structure embodying the present invention which may be located exteriorly adjacent a mill site or other industrial source of air to be filtered.

The filter structure comprises a cylindrical outer casing 2 which may be of corrugated metal for strength purposes and which supports an upwardly spaced roof 3 by means of circumferentially spaced struts 4. Further details of the roof structure are hereinafter provided.

Figure 2:
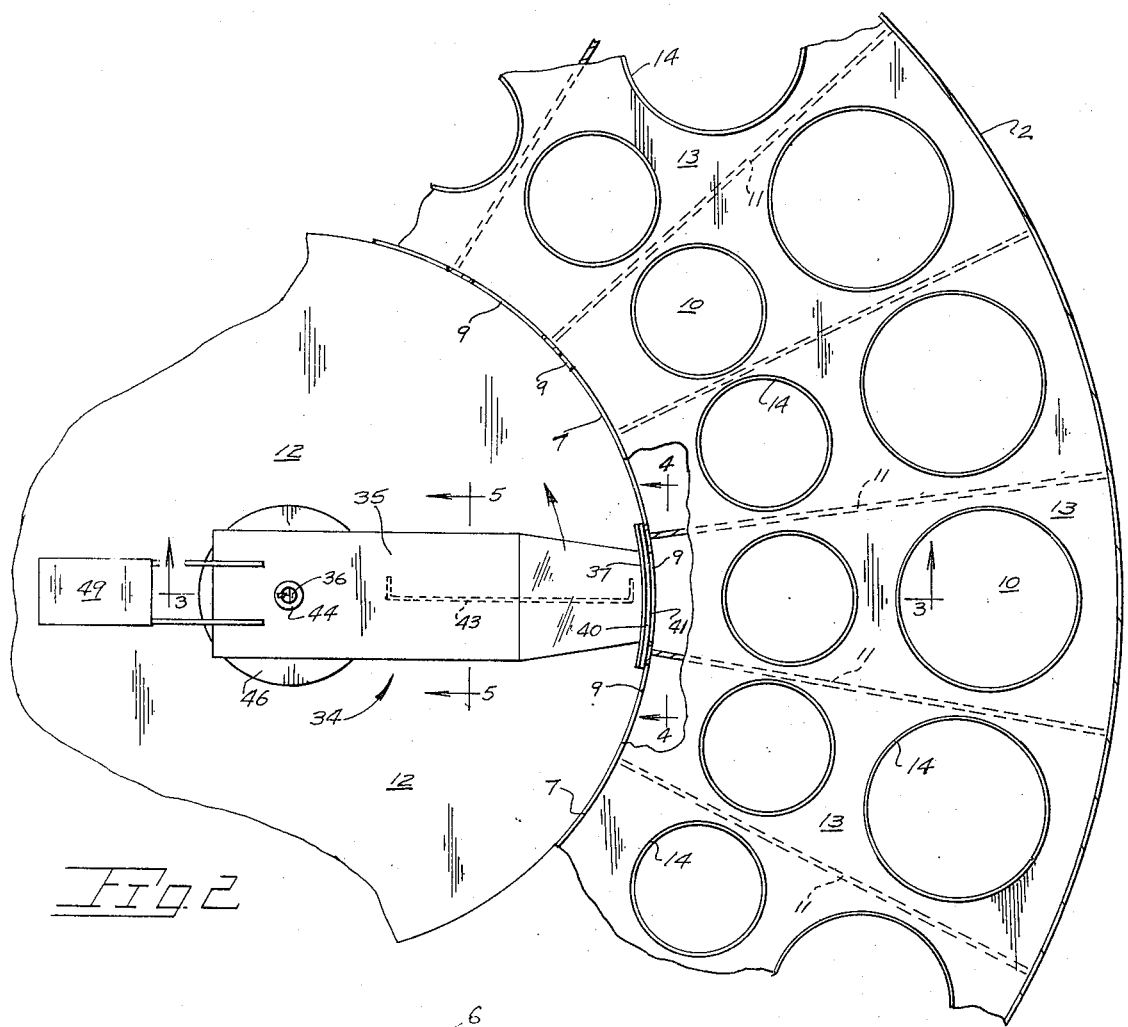
FIG. 2 is a plan view taken along line 2—2 of FIG. 1 showing a rotatable purge assembly and associated structure.
Figure 3:
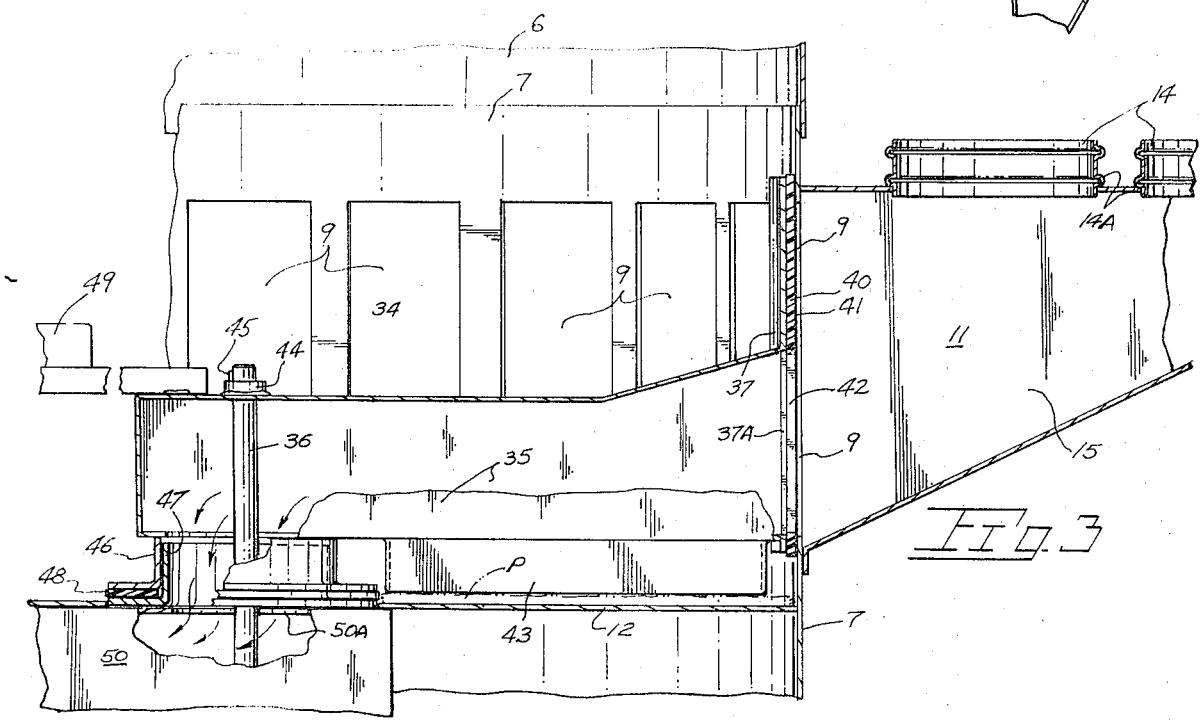
FIG. 3 is a sectional elevational view of the purge assembly taken along line 3—3 of FIG. 2.

A duct at 5 carrying dust laden air exhausts downwardly into a central inlet 6 which in a typical embodiment of the present filter would be 5 feet or so in diameter. Depending upon the nature of the filtering task to be performed, duct 5 may be in upstream communication with a cyclonic separator or other type of separator performing an initial filtering operation. Means are preferably provided intermediate duct 5 and inlet 6 to effect a seal therebetween. Adjacent the lower end of inlet 6 and supporting the latter is the filter base comprising a fabricated metal structure including a circular walled enclosure 7 braced about its lower circumference by ground engaging gussets 8. Formed within walled enclosure 7 of the base, as best viewed in FIGS. 2 and 3 are circumferentially spaced apart ports 9 each being of elongate shape. A false floor 12 causes dust laden air moving downward through inlet 6 to be redirected in an upwardly direction for outward passage through ports 9.

Extending upwardly and outwardly from the exterior of circular enclosure 7 is a conical bottom wall 10 terminating in peripheral securement with the lower periphery of cylindrical outer casing 2. Spaced upwardly from inclined wall 10 is an annular plate 13 defining the lower extremity of casing 2 and the upper limit of later described plenums. Annular plate 13 constitutes a bag mounting plate. Radially disposed divider gussets or walls at 11 serve to define triangular plenum areas 15 intermediate bottom wall 10 and annular plate 13.

Each of said plenum areas 15 is in upstream communication with an incoming dust laden airflow via a port 9 and conversely in downstream communication with later described filter bags via bag rings 14 secured within openings in annular plate 13. That segment of annular plate 13 extending intermediate successive divider gussets is of a width to receive a pair of bag rings 14 with the innermost ring being somewhat less in diameter by reason of the converging nature of the divider gussets 11. The bag rings and the filter bags secured thereby may be varied for specific installations.

Each bag ring secures the lower end of a tubular filter bag 17 with a bag clamp 20 (FIG. 1) cooperating with ridges 14A on the bag rings. Spaced at intervals along each bag 17 are rings 21 each of which is isolated from bag material by means of a sewn fabric enclosure stitched to the bag. During bag purging, the rings retain the bag against total deflation and are isolated by their fabric enclosure from rubbing contact with the bag to avoid bag abrasion. Each bag terminates upwardly in attachment with a shaped rod-like bag holder 22 as best viewed in FIG. 6 with the upper end of each bag being looped back upon itself and stitched along a stitch line 23 to receive the bag holder 22. Supporting the bag holders 22 are rolled concentric angle irons 24 and 25 which are suitably attached to the filter roof structure 3 with the bag holders 22 extending through openings at circumferentially spaced locations. Nuts at 26 secure the bag holders in place.

The open area at 27 immediately above casing 2 and below roof 3 serves as an outlet for the filtered flow of air discharged from the filter bags 17. For periodic inspection and servicing of the filter bags an access door 30 is provided in the outer cylindrical casing 2.

Purge Assembly

For sequential cleaning of filter bags 17 a rotating purge assembly indicated generally at 34 is provided which is disposed within circular walled enclosure 7 with the assembly being spaced above the false floor 12 extending across enclosure 7.

With attention to FIGS. 2 and 3 the purge assembly 34 includes a rotating purge duct 35 (having a negative pressure therewithin) for powered movement about the vertical axis of a drive shaft 36 driving the duct. The duct 35 terminates outwardly in a metal plate 37 on which is superimposed an overlying plate 40 by means of counter sunk fasteners not shown. Plate 40 has an arcuate outer surface 41 which effects a moving seal with the interior surface of circular walled enclosure 7. A suitable material for plate 40 is polyethylene. An opening 42 in plate 40 is in registration with a like opening 37A in plate 37 to define a purge inlet passageway. Accordingly, upon opening 42 coming into at least partial communication with a port 9, purge duct 35 is communicated with a triangular plenum area 15 subjacent a pair of radially spaced bag rings 14. Simultaneously, the adjacent solid upper portion of plate 40 closes off the upper portion of a port 9 thereby preventing the entry of dust laden air into the triangular plenum 15 during purging. Similarly leading and trailing surfaces at 41A–41B of the plate close the port to dust laden air before and after centering of the duct with the port.

From this it will be seen that duct 35, in constant communication with a source of below atmospheric pressure as later described, will impart a purging reverse airflow to the paired filter bags 17 while the bag interiors are closed off from the normal dust laden airflow. In FIG. 4, phantom lines disclose the relative positions of a port 9 and plate 20 at the extremes of purging action and beyond which the port is opened to dust laden air. Importantly, dirt and dust particles previously collected on the interior of each pair of bags 17 are dislodged by an airflow inwardly through the bag wall. The inward airflow is of previously filtered air dischared by adjacent bags 17.

As best viewed in FIGS. 4 and 5 the purge duct 35 is provided with a scavenging means in the form of a depending flange 43 which serves to gather particles at P from the false floor 12 and move same upwardly during duct rotation towards a slot 35B formed longitudinally along the duct. Dust particles P on floor 12 are deposited thereon during upward redirection of dust laden air upwardly through ports 9 causing a change in air velocity. As duct 35 is in communication with a source of negative pressure the continuous airflow entering slot 35B carries with it a quantity of dust particles from the moving particle mound traveling immediately ahead of flange 43. Accordingly, means are provided on the purge assembly for continuous removal of dust particles from floor 12 thereby obviating periodic cleaning of said floor.

As viewed in FIG. 3 duct 35 is provided with a suitable bushing at 44 to receive drive shaft 36 keyed at 45 to the bushing for imparting continuous shaft rotation to the duct. Affixed to the underside of duct 35 is a flanged collar 46 defining an opening in duct 35 permitting downward airflow through the collar and through a second flanged collar at 47 secured to a stationary, radially disposed exhaust duct 50. A bearing ring 48, of a suitable resinous material such as polyethylene, provides desired bearing characteristics between the flanged collars. A circular opening 50A in duct 50 permits entry of the downward passing purge flow into stationary duct 50 towards the source of negative pressure. To assure uniform, surfacial contact of plate 40 with the circular wall of enclosure 7, a counterweight 49 is provided.

For driving of purge assembly 34 in its sweeping horizontal path a motor 60 is mounted exteriorly of circular enclosure 7 by a support bracket 61. A reduction drive 62 having a driving sprocket 63 drives a roller chain 64 which is entrained about a driven sprocket 65 the latter keyed to drive shaft 36. Bearings at 66 suitably journal the lower end of shaft 36 with the bearings being mounted internally of a drive housing 67. Preferably roller chain 64 is supported along its runs by a chain support plate secured transversely along housing 67.

With attention again to stationary exhaust duct 50 the same extends radially outward through circular enclosure 7 and thereat discharges into the intake side of a centrifugal blower 70 or other suitable source of below atmospheric pressure. Blower 70 driven by motor 71 serves to both purge and thence discharge the particles purged along an exhaust duct 72 which ultimately may return the particles to the inlet side of a cyclonic separator or other type of separator performing a preliminary filtering operation.

Additionally important to the operation of the present filter is the fabric used in the manufacture of the filter bag 17 with one highly satisfactory material being of woven polypropolyene identified as weave style 1114, 11 ounce material having a 60 to 70 CFM rating and manufactured by the Filter Media Division of the Carborundum Company. Such material in the present bag form is of tubular configuration with a nap on its interior surface which is highly effective in collecting the dust particles.

As the air exhausted into the interior of casing 2 is filtered air, a negative pressure within a pair of bags 17 results in filtered casing air passing inwardly through the bag wall at a rate adequate to separate collected particles from the interior bag surface. The dislodged particles under the influence of gravity and a downward airflow through the bag enter the triangular plenum 15 and thence pass into purge duct 35 during a purging operation.

In one highly satisfactory embodiment of the invention 24,000 cubic feet per minute of air is filtered by a filter structure having a 5 foot diameter inlet 6, 20 filter bags of 11½ inches in diameter and 20 filter bags of 16 inches diameter. A complete cycle or one rotation of purge assembly 34 occurs every 3 minutes with the blower 70 imparting between 2 and 4 inches negative static pressure water gauge (S.P.W.G.) to duct 35. Obviously duct rotation speeds may be easily varied to suit the specific filtering operation as may the negative pressure value.

While but one embodiment of the present invention has been set forth such is not intended to so restrict the scope of protection desired but rather such is intended to encompass all forms of the invention coming within the scope of the appended claims.

What we claim and desire to secure under a Letters Patent is:

1. An air filter structure, said structure comprising in combination, an upright casing enclosing a plurality of filter bags, said casing normally open to the atmosphere, an air inlet centrally disposed within said casing and extending axially substantially the length of the filter structure for the reception and passage of an uninterrupted flow of dust laden air to be filtered, a circular walled enclosure integral with the discharge end of said air inlet and defining ports spaced thereabout through which the dust laden air normally passes in an outward direction from said enclosure, said enclosure having a floor against which dust laden air is slowed by impingement thereagainst, a bag mounting plate affixed to the exterior of said circular walled enclosure, filter bags in supported attachment at their lower ends to the bag mounting plate and radially spaced from the air inlet of the filter structure, said filter bags open at their lower end and thereat receiving a flow of dust laden air for travel in a direction opposite to air passing through said inlet, a series of plenums each partially defined by said walled enclosure and said mounting plate with each of said plenums in upstream communication with a port in said walled enclosure and oppositely in communication with the open end of at least one of said filter bags, said plenums further defined by divider wall members contiguous with said enclosure at their inner extremities, and a purge assembly including a traveling purge duct mounted within said walled enclosure for rotation above the enclosure floor and in communication with a remote source of negative air pressure, an upright plate member at the outer end of said duct in unbiased contact with the circular walled enclosure to sequentially close off the ports therein to incoming dust laden air, said plate member additionally defining a purge opening sequentially communicating duct negative pressure to each plenum via a port and to a filter bag associated therewith to impart a reverse flow through the filter bag wall whereby dust particles caked along the bag interior are periodically dislodged from the bag for removal through the bag lower end, a plenum and the purge duct.

2. The air filter structure as claimed in claim 1 wherein said filter bags are of a woven fabric characterized by a porosity having a 60 to 70 cubic feet per minute per square foot rating.

3. The air filter structure as claimed in claim 1 wherein each of said plenums is further defined by an inclined bottom wall extending intermediate the periphery of the bag mounting plate and the walled enclosure.

4. The air filter structure as claimed in claim 3 wherein said bag mounting plate is provided with multiple bag collars of at least two different diameters with each of said collars being in communication with a plenum therebelow.

5. An industrial air filter structure receiving a dust laden airflow from a primary air-particle separator, said filter structure comprising in combination, an upright casing enclosing a plurality of filter bags, said casing normally open to the atmosphere, a tubular inlet centrally disposed within the casing for reception of a downward flow of dust laden air, a walled enclosure of circular configuration integral with the end of said inlet for reception of the dust laden air, said enclosure defining ports spaced circumferentially thereabout through which the dust laden airflow normally passes, a floor extending across and closing the lower end of the enclosure opposite the inlet end, a bag mounting plate affixed to the upper peripheral edge of the walled enclosure, filter bags mounted at their ends to the bag mounting plate and radially spaced from the tubular inlet, said bags receiving at their lower ends a flow of dust laden air for upward passage therealong, a series of plenums circumferentially disposed about said walled enclosure each in communication with one of said ports and with at least one filter bag, each of said plenums defined by upright divider walls, an inclined bottom wall of the filter structure extending intermediate the outer periphery of the bag mounting plate and the walled enclosure, said bag mounting plate and said walled enclosure, and a purge assembly within said walled enclosure and comprising a traveling purge duct in central communication with a continuous source of negative air pressure, an arcuate plate member carried by the duct outer end for moving surfacial contact with the walled enclosure, said plate member defining a purge opening sequentially communicating duct negative pressure to one of said plenums via one of said ports and to a filter bag associated therewith to impart a reverse flow through the filter bag wall whereby dust particles deposited on the bag interior are dislodged from the bag for removal through said one of said plenums and the purge duct, said plate having port blocking surfaces adjacent said purge opening for blocking the entry of dust laden air during arcuate travel of the purge duct past said one port during filter bag purging.

6. The air filter structure as claimed in claim 5 wherein said bag mounting plate is provided with multiple bag collars of at least two different diameters with each of said collars being in communication with a plenum therebelow.

7. The air filter structure as claimed in claim 5 wherein said purge duct includes scavenging means on the underside of said duct for applying negative duct pressure to the surface of the enclosure floor below said duct for the intake of floor deposited dust particles.

8. The air filter structure as claimed in claim 7 wherein said scavenging means includes flange means depending from the duct facilitating the pick up of floor deposited dust particles.

9. The air filter structure as claimed in claim 7 wherein said purge assembly includes a counterweight oppositely located on the duct from said plate member facilitating uniform surfacial contact of said plate member with said circular enclosure, and wherein said plate member includes an overlying plate of friction resistant material to achieve suitable sliding and sealing contact with the walled enclosure defining said ports.

10. The air filter structure as claimed in claim 9 wherein said filter bags are of a woven fabric characterized by a porosity having a 60 to 70 cubic feet per minute per square foot rating.

11. In an air filter structure having a plurality of upright filter bags, a circular walled enclosure receiving an axial flow of dust laden air, a series of circumferentially spaced ports in said walled enclosure with each of said ports normally in downstream communication via a plenum with the lower end of a filter bag, a floor closing the lower end of the circular walled enclosure causing the axial flow to be diverted radially through said ports, the improvement comprising, a rotatable purge assembly centrally journalled within said enclosure including a radially extending purge duct in communication with a source of negative air pressure for bag purging, an upright plate member of arcuate section at the outer end of said duct moving in unbiased contact with the circular walled enclosure to sequentially close off the ports therein to incoming dust laden air, said plate member additionally defining a purge opening sequentially communicating duct negative pressure via one of said ports to the end of a filter bag associated therewith to impart a reverse flow through the bag wall whereby dust particles previously deposited on the bag interior are periodically dislodged from the bag for removal through the bag lower end and the purge duct, said plate member having port blocking surfaces adjacent said purge opening for blocking the flow of dust laden air through the port for intervals preceding and subsequent to alignment of the purge opening with the port permitting purging during arcuate travel of the duct, said purge duct additionally including scavenging means disposed along the underside of said duct for applying negative duct pressure to the subjacent floor surface of the circular walled enclosure for duct intake of floor deposited dust particles.

12. The invention as claimed in claim 11 wherein said purge assembly additionally includes a counterweight oppositely located on the duct from said plate member facilitating uniform surfacial contact of the plate member with said circular walled enclosure.

13. The invention as claimed in claim 12 wherein said plate member includes an overlying plate of a polymeric material for suitable sliding and sealing contact with the circular walled enclosure defining said ports.

* * * * *